Figure 2:
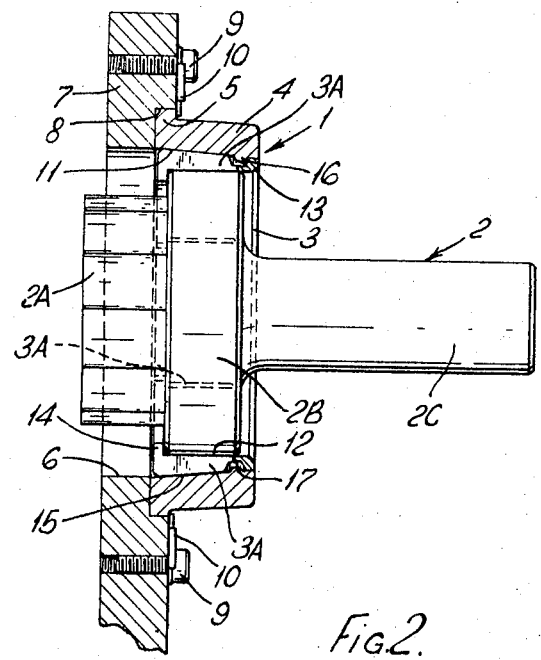

United States Patent [19]

Armour et al.

[11] 3,822,790
[45] July 9, 1974

[54] TOOL-HOLDING DEVICES

[75] Inventors: Richard Rodney Armour; Anthony James Thomas Evans, both of London, England

[73] Assignee: Molins Limited, London, England

[22] Filed: Sept. 5, 1972

[21] Appl. No.: 286,101

[30] Foreign Application Priority Data
Sept. 9, 1971  Great Britain................. 42211/71

[52] U.S. Cl. ............ 211/60 T, 24/73 PF, 279/1 Q, 279/1 SG, 279/1 TS, 294/99 R, 403/199, 403/371
[51] Int. Cl.............................................B23q 3/157
[58] Field of Search............ 211/60 T, 60 R, 69, 1.5; 279/1 Q, 1 SG, 1 TS, 80, 43; 294/99, 33, 86.32; 24/255 BS, 73 PF; 29/26 A; 287/52.06, 52.04; 403/199, 192, 342, 372, 365, 371, 243, 374

[56]  References Cited
UNITED STATES PATENTS
| | | | |
|---|---|---|---|
| 2,123,791 | 7/1938 | Neilson | 294/99 R X |
| 2,615,644 | 10/1952 | Enz | 279/1 Q UX |
| 3,253,136 | 5/1966 | Faul | 287/52.06 X |
| 3,604,565 | 9/1971 | Freeman | 211/60 T |
| 3,661,050 | 5/1972 | Erickson | 29/26 A X |

FOREIGN PATENTS OR APPLICATIONS
| | | | |
|---|---|---|---|
| 564,602 | 7/1960 | Belgium | 294/99 R |
| 1,021,787 | 3/1966 | Great Britain | 211/69 |
| 1,380,227 | 10/1964 | France | 24/73 PF |
| 586,289 | 4/1957 | Italy | 287/52.06 |

Primary Examiner—Roy D. Frazier
Assistant Examiner—Abraham Frankel
Attorney, Agent, or Firm—Emory L. Groff; Emory L. Groff, Jr.

[57] ABSTRACT

A tool-holder has a housing with an inner tapered bore in which a correspondingly tapered resilient collet is axially movable, the tool being gripped inside the collet. Axial movement of the collet is limited by a bead on the housing bore fitting loosely in a groove in the collet. When the tool is inserted in the tool-holder the collet is moved towards the wider part of the bore, allowing easy insertion, but withdrawal of the tool causes movement in the opposite direction, producing a limited increase in the grip on the tool.

5 Claims, 2 Drawing Figures

TOOL-HOLDING DEVICES

This invention concerns improvements in or relating to tool-holding devices for rotary cutting tools.

In U.S. Pat. No. 3,604,565 there is disclosed a tool-holder which grips a rotary cutting tool by means of resilient rings recessed in the tool-holder. Such a tool-holder is particularly applicable to a tool-changing arrangement such as described in U.S. Pat. No. Re. 25,956 in which the spindle of a numerically-controlled machine tool is aligned with a tool in the tool-holder, engages and withdraws the tool and after use replaces it in the tool-holder. However, difficulties are sometimes encountered with such a tool-holder in that the resilient rings are easily subject to damage upon replacement of the tool by the spindle if the latter is not fully aligned with the tool-holder. As a result the damaged rings may not be capable of exerting a sufficient grip on the tool to enable the spindle to replace the tool in the tool-holder.

According to the present invention there is provided a tool-holder for storing a rotary cutting tool, comprising a resilient collet for gripping the tool, a housing having a tapered bore in which the collet is axially movable, the collet being radially compressible upon movement towards the narrow end of the bore, and means limiting said movement of the collet, the tool being inserted and withdrawn from the narrow end of the bore, and the grip on the tool being sufficient to produce said movement upon withdrawal of the tool so that the collet is compressed and increases its grip on the tool.

Figure 1:
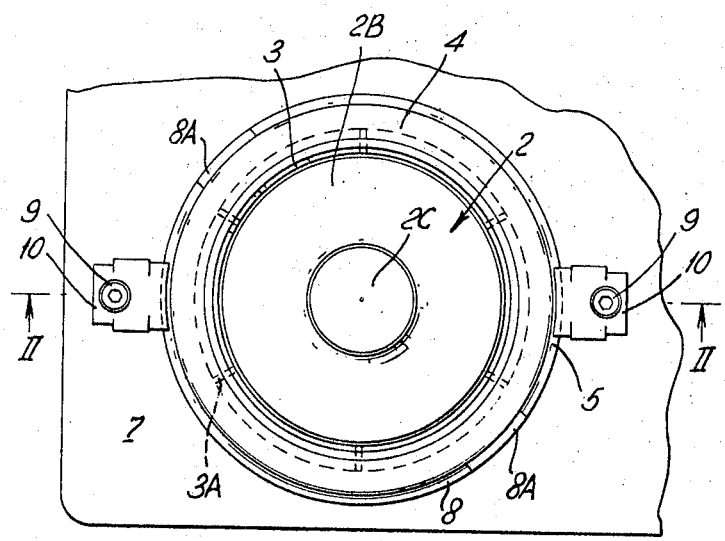

An example of a tool-holder in accordance with the invention is shown in the accompanying drawings in which:

FIG. 1 is an end view of a tool-holder, and
FIG. 2 is a section taken along the line II—II of FIG. 1.

In FIGS. 1 and 2 a tool-holder, indicated generally by the reference numeral 1, is shown holding a rotary cutting tool 2. The cutter 2A of the tool 2 is held in a cylindrical chuck 2B of larger diameter than the cutter. The chuck 2B has an attacked shank 2C of a diameter suitable to be received in a spindle of a machine tool in which the tool 2 is to be used.

The tool-holder 1 consists of two generally cylindrical parts: a resilient sleeve or collet 3, and a housing 4 in which the collet is mounted. A flange 5 is formed at one end of the housing 4 to fit over a hole 6 (FIG. 2) in a tool-magazine 7 into which the cutter 2A projects. Only a part of the magazine has been shown; the remainder of the magazine supports further tool-holders similar to the one herein described.

The flange 5 of the housing 4 is located in a counterbore 8 in the hole 6, and secured by a screw 9 and a clip 10 at each of two diametrically opposite sides of the hole. The flange 5 of the housing 4 has two slots 8A wider than the clips 10 so that the housing may be rapidly assembled by inserting the housing axially with the slots 8A aligned with the clips 10 and then rotating the housing (in the manner of a bayonet fastening) to the position shown in FIG. 1.

The housing 4 has a bore 11 tapering inwards away from the end adjacent the flange 5 at an angle of approximately 5°.

The operative part of the collet 3 is provided with six longitudinally extending slots 3A. The collet is inwardly biased by its inherent resilience so that its bore 12 engages the grips and chuck 2B of the tool 2. The unslotted end of the bore 12 is chamfered at 13 to provide a lead-in for insertion of the tool; the other end of the bore terminates in a shoulder 14 which abuts the end of the chuck 2B adjacent the cutter 2A to limit insertion of the tool. In the position shown the external surface 15 of the collet conforms to the shape of the tapered bore 11 of the housing 4 and fits loosely therein.

Towards the end of the housing remote from the flange 5, the tapered bore 11 is formed with an annular bead 16. At a corresponding position on the outer surface 15 of the collet, and coinciding approximately with the ends of the slots 3A, an annular Vee-shaped groove 17 is formed. As can be seen in FIG. 2, the groove 17 abuts the outer edge of the bead 16, but provides axial clearance with the inner edge; this arrangement allows limited axial movement of the collet relative to the housing.

In the tool-holder illustrated both the collet 3 and the housing 4 are made of a glass-filled nylon material which has a suitable coefficient of friction to allow movement of the collet. The housing 4 may, alternatively, be made of aluminum.

The operation of the tool holder is as follows.

If the tool 2 is to be withdrawn, the shank 2C of the tool is engaged, for example by the spindle mentioned above. Due to the loose fit between the collet 3 and the housing 4, both the collet and the tool 2 are initially withdrawn by the spindle. As the outer surface 15 of the collet becomes progressively wedged in the tapered bore 11 of the housing, the collet is externally compressed and increases its grip on the tool whilst resistance to movement of the collet relative to the housing also increases. A point is soon reached at which movement of the collet ceases, either because the resistance to movement of the collet becomes larger than its axial gripping force on the tool, or because the axial clearance between the bead 16 and the groove 17 has been taken up. A relatively large force therefore becomes necessary for further withdrawal of the tool. When the tool has been fully withdrawn the collet contracts away from the tapered bore 11 of the housing.

After use of the tool 2 the spindle replaces the tool in the tool-holder. Insertion of the tool expands the collet 3 and returns it back to its loose position in the housing 4, allowing the tool to be inserted with a relatively low axial force, so that the bore 12 is less prone to wear or damage. Furthermore the loose fit of the collet in the housing now allows a relatively large degree of misalignment of the spindle to be taken up. Thus if the spindle tries to release the tool but, owing to misalignment, the shank 2C of the tool is still partly held by the spindle, the grip on the chuck 2B will increase upon withdrawal of the spindle, as described above, and the tool will be firmly held in the tool-holder.

We claim:

1. In combination, a tool holder for mounting in a support and a rotary cutting tool stored in said tool holder, said rotary cutting tool including a cylindrical holdable portion, said tool holder comprising a resilient collet having a relaxed internal diameter smaller than the diameter of the holdable portion of the tool so as to grip said portion, a housing fixed in said support having a bore tapering inwardly towards a narrow tool-receiving end in which said collet is freely mounted for axial movement so that the collet is radially compressed when so moving axially towards the narrow end of the bore, and means on said collet and said housing limiting said axial movement of the collet, said tool being inserted and withdrawn from said narrow end, and the grip exerted on said tool by said collet at the wide end of the bore being sufficient to produce said limited axial movement of said collet upon withdrawal of said tool, whereby said collet becomes radially compressed and increases its grip on said tool.

2. The combination according to claim 1 wherein the means limiting said movement of the collet comprises an annular bead formed on the narrow end of the bore of the housing and an annular groove in the collet to surround the bead and of a width greater than the width of the bead.

3. The combination according to claim 1 wherein the end of the collet adjacent the wide end of the bore is formed with an internal shoulder against which the tool inserted therein abuts.

4. The combination according to claim 3 wherein at least said end of the collet is radially slotted to increase the resilience of the collet.

5. The combination according to claim 1 wherein the collet is made of a glass-filled nylon material.

* * * * *